(12) United States Patent
El-Nozahi et al.

(10) Patent No.: US 11,450,952 B2
(45) Date of Patent: Sep. 20, 2022

(54) BEAMFORMER AUTOMATIC CALIBRATION SYSTEMS AND METHODS

(71) Applicant: Analog Devices International Unlimited Company, County Limerick (IE)

(72) Inventors: Mohamed El-Nozahi, Giza (EG); Hossam Aly Hassan Fahmy, Maadi (EG); Ahmed Amer, Qalyoubia (EG); Yousri Ahmed, Giza (EG); Mohamed Kamel Hussein, Cairo (EG)

(73) Assignee: Analog Devices International Unlimited Company, Limerick (IE)

( * ) Notice: Subject to any disclaimer, the term of this patent is extended or adjusted under 35 U.S.C. 154(b) by 379 days.

(21) Appl. No.: 16/801,562

(22) Filed: Feb. 26, 2020

(65) Prior Publication Data
US 2021/0265726 A1  Aug. 26, 2021

(51) Int. Cl.
*H04J 3/16* (2006.01)
*H01Q 3/24* (2006.01)
*H04L 1/16* (2006.01)

(52) U.S. Cl.
CPC ............... *H01Q 3/24* (2013.01); *H04J 3/16* (2013.01); *H04L 1/16* (2013.01)

(58) Field of Classification Search
CPC .. H01Q 3/24; H01Q 3/267; H04J 3/16; H04L 1/16; H04L 29/06; H04L 47/10; H04L 29/06027; H04L 29/06163; H04Q 11/0478
See application file for complete search history.

(56) References Cited

U.S. PATENT DOCUMENTS

| 4,864,315 | A |   | 9/1989  | Mohuchy              |
| 5,235,342 | A |   | 8/1993  | Orton                |
| 5,412,414 | A | * | 5/1995  | Ast ........... G01S 7/4017 |
|           |   |   |         | 342/372              |
| 5,581,517 | A |   | 12/1996 | Gee et al.           |

(Continued)

FOREIGN PATENT DOCUMENTS

| CN | 101479885 A | 7/2009  |
| CN | 101904051 A | 12/2010 |

(Continued)

OTHER PUBLICATIONS

U.S. Appl. No. 15/611,289 including its ongoing prosecution history, including without limitation Office Actions, Amendments, Remarks, and any potentially relevant documents, filed Jun. 1, 2017, Khalil et al.

(Continued)

*Primary Examiner* — Phuongchau Ba Nguyen
(74) *Attorney, Agent, or Firm* — Knobbe, Martens, Olson & Bear, LLP

(57) ABSTRACT

Aspects of this disclosure relate to an antenna array system and method of calibration using power and/or phase detectors equidistant between transmit paths of antenna array channels, and using power and/or phase detectors equidistant between receive paths of antenna array channels. In some aspects, the antenna array can calibrate the power and/or phase detectors based on a common signal transmitted from an output of a transmit path and/or an output of a receive path of a channel. In some aspects, the antenna array can calibrate receive and transmit paths across antenna array chips.

17 Claims, 10 Drawing Sheets

(56) References Cited

U.S. PATENT DOCUMENTS

| | | | |
|---|---|---|---|
| 5,657,023 A | 8/1997 | Lewis et al. | |
| 5,864,317 A | 1/1999 | Boe et al. | |
| 5,864,543 A | 1/1999 | Hoole | |
| 6,104,935 A | 8/2000 | Smith | |
| 6,208,287 B1 | 3/2001 | Sikina | |
| 6,252,542 B1 | 6/2001 | Sikina | |
| 6,356,233 B1 | 3/2002 | Miller | |
| 7,068,218 B2 | 6/2006 | Gottl et al. | |
| 7,362,266 B2 | 4/2008 | Collinson | |
| 7,471,237 B2 | 12/2008 | Wooldridge | |
| 7,576,686 B2 | 8/2009 | Needham et al. | |
| 7,714,776 B2 | 5/2010 | Cooper et al. | |
| 7,904,117 B2 | 3/2011 | Doan et al. | |
| 7,911,376 B2 | 3/2011 | Hardacker et al. | |
| 8,004,456 B2 | 8/2011 | Scott | |
| 8,045,926 B2 | 10/2011 | Martikkala et al. | |
| 8,199,048 B1 | 6/2012 | Medina Sanchez | |
| 8,295,788 B2 | 10/2012 | Rofougaran et al. | |
| 8,559,571 B2 | 10/2013 | Tung et al. | |
| 8,593,337 B2 | 11/2013 | Ookawa | |
| 8,976,845 B2 | 3/2015 | O'Keeffe et al. | |
| 9,035,828 B2 | 5/2015 | O'Keeffe et al. | |
| 9,113,346 B2 | 8/2015 | Pivit et al. | |
| 9,319,904 B1 | 4/2016 | Srinivasa et al. | |
| 9,331,751 B2 | 5/2016 | Sikina et al. | |
| 9,444,577 B1 | 9/2016 | Zhang et al. | |
| 9,628,256 B2 | 4/2017 | O'Keeffe et al. | |
| 9,692,530 B2 | 6/2017 | O'Keeffe | |
| 9,705,611 B1 | 7/2017 | West | |
| 9,762,283 B2 | 9/2017 | Chen et al. | |
| 9,876,514 B1 | 1/2018 | Corman et al. | |
| 9,912,467 B2 | 3/2018 | Alpert et al. | |
| 10,211,527 B2 | 2/2019 | Safavi-Naeini et al. | |
| 10,263,650 B2 | 4/2019 | Corman et al. | |
| 10,305,564 B1 | 5/2019 | Stang et al. | |
| 10,469,183 B1 | 11/2019 | Kuo | |
| 11,177,567 B2* | 11/2021 | Khalil | H04B 17/21 |
| 2001/0005685 A1 | 6/2001 | Nishimori | |
| 2002/0089447 A1 | 7/2002 | Li | |
| 2002/0171583 A1 | 11/2002 | Purdy | |
| 2004/0032365 A1 | 2/2004 | Gatti | |
| 2004/0061644 A1 | 4/2004 | Lier et al. | |
| 2006/0234694 A1 | 10/2006 | Kawasaki | |
| 2006/0273959 A1 | 12/2006 | Kawasaki | |
| 2008/0129613 A1 | 6/2008 | Ermutle et al. | |
| 2008/0225174 A1 | 9/2008 | Greggain et al. | |
| 2009/0267824 A1 | 10/2009 | Cooper et al. | |
| 2010/0117890 A1 | 5/2010 | Vook et al. | |
| 2011/0006949 A1 | 1/2011 | Webb | |
| 2012/0027066 A1* | 2/2012 | O'Keeffe | H01Q 3/267 375/224 |
| 2012/0146840 A1 | 6/2012 | Ookawa | |
| 2013/0077708 A1 | 3/2013 | Sorrells et al. | |
| 2013/0120190 A1 | 5/2013 | McCune, Jr. | |
| 2013/0234883 A1 | 9/2013 | Ma et al. | |
| 2014/0111373 A1 | 4/2014 | Puzella et al. | |
| 2014/0169509 A1 | 6/2014 | Tsofe | |
| 2014/0210668 A1 | 7/2014 | Wang | |
| 2015/0115978 A1 | 4/2015 | Bories | |
| 2015/0138026 A1 | 5/2015 | Shay | |
| 2015/0255868 A1 | 9/2015 | Haddad et al. | |
| 2016/0043465 A1* | 2/2016 | McDevitt | G01S 13/91 342/368 |
| 2016/0191176 A1 | 6/2016 | O'Keeffe et al. | |
| 2016/0197660 A1 | 7/2016 | O'Keeffe et al. | |
| 2017/0117950 A1 | 4/2017 | Strong | |
| 2017/0234971 A1 | 8/2017 | Arai | |
| 2017/0310004 A1 | 10/2017 | Swirhum | |
| 2017/0324486 A1 | 11/2017 | Garcia | |
| 2018/0034565 A1 | 2/2018 | Tankielun | |
| 2018/0062260 A1 | 3/2018 | Khalil et al. | |
| 2018/0198537 A1 | 7/2018 | Rexberg | |
| 2018/0331712 A1* | 11/2018 | O'Brien | H04B 17/21 |
| 2019/0058530 A1 | 2/2019 | Rainish et al. | |
| 2019/0149247 A1 | 5/2019 | Ananth | |
| 2019/0158194 A1 | 5/2019 | Wang | |
| 2019/0267707 A1 | 8/2019 | Khalil et al. | |
| 2020/0091608 A1 | 3/2020 | Alpman et al. | |

FOREIGN PATENT DOCUMENTS

| | | |
|---|---|---|
| CN | 102347532 A | 2/2012 |
| EP | 2 173 010 A1 | 4/2010 |
| EP | 2273614 | 1/2011 |
| EP | 2 285 102 A2 | 2/2011 |
| KR | 10-1564730 B1 | 10/2015 |
| WO | WO 2018/119153 A2 | 6/2018 |
| WO | WO 2018/166575 A1 | 9/2018 |

OTHER PUBLICATIONS

U.S. Appl. No. 15/904,045 including its ongoing prosecution history, including without limitation Office Actions, Amendments, Remarks, and any potentially relevant documents, filed Feb. 23, 2018, Khalil et al.

U.S. Appl. No. 15/590,903 including its ongoing prosecution history, including without limitation Office Actions, Amendments, Remarks, and any potentially relevant documents, filed May 9, 2017, O'Brien et al.

"A calibration technique for active phased array antennas," Phased Array Systems and Technology, 2003, in 3 pages.

Agrawal et al., "A Calibration Technique for Active Phased Array Antennas," Johns Hopkins University Applied Physics Laboratory (2003) in 8 pages.

Jing et al., "Self-Calibration for the Multiple Channel Phase Array System Based on Near-Field Weighting," Key Laboratory of Electronics and Information Technology in Satellite Navigation (Beijing Institute of Technology, 100081) Ministry of Education, Beijing, China, Radar Conference (2015) IET International, 6 pages.

Kanemaru et al., "79 GHz CMOS Circuits for Phase/Amplitude Calibration in High-resolution Beamforming Radar System", Proceedings of the 43rd European Microwave Conference (2013) pp. 1615-1618.

Kumar, M., et al., "Broad-Band Active Phase Shifter Using Dual-Gate MESFET", IEEE Transactions on Microwave Theory and Techniques, vol. MTT-29, No. 10, Oct. 1981, pp. 1098-1102.

"Mutual coupling-based calibration of phased array antennas," Phased Array Systems and Technology, 2000, in 3 pages.

Sato et al., "Millimeter wave CMOS integrated circuit for multi-gigabit communication and radar applications", Radio-Frequency Integration Technology (RFIT) 2015 IEEE International Symposium (2015) pp. 49-51, 2015.

Seker, "Calibration methods for phased array radars," Radar Systems Engineering Department, ASELSAN, Ankara, Turkey, 2016, in 16 pages.

Shipley et al., "Mutual Coupling-Based Calibration of Phased Array Antennas," Technology Service Corporation (2000) in 4 pages.

Valdes-Garcia et al., "A Fully Integrated 16-Element Phased-Array Transmitter in SiGe BiCMOS for 60-GHz Communications," IEEE Journal of Solid-State Circuits (Dec. 12, 2010) vol. 45, No. 12, pp. 2757-2773.

Office Action dated Jun. 10, 2020 for Chinese Patent Application No. 201780051930.1, 8 pages and 9 page translation.

International Search Report dated Nov. 7, 2017 for International Application No. PCT/EP2017/071427, 6 pages.

Written Opinion of the International Searching Authority dated Nov. 7, 2017 for International Application No. PCT/EP2017/071427, 10 pages.

* cited by examiner

BEAMFORMER AUTOMATIC CALIBRATION SYSTEMS AND METHODS

FIELD OF THE DISCLOSURE

The present disclosure relates to an antenna array and calibration of the antenna array.

BACKGROUND

An antenna with a single antenna element will typically broadcast a radiation pattern that radiates equally in all directions in a spherical wavefront. Phased antenna arrays generally refer to a collection of antenna elements that are used to focus electromagnetic energy in a particular direction creating a main beam. Phased antenna arrays are being used more frequently in a myriad of different applications, such as in military applications, mobile technology, on airplane radar technology, automotive radars, cellular telephone and data, and Wi-Fi technology.

The individual antenna elements of a phased-antenna array may radiate in a spherical pattern, but collectively generate a wavefront in a particular direction through constructive and destructive interference. The relative phases of the signal transmitted at each antenna element can be either fixed or adjusted, allowing the antenna system to steer the wavefront in different directions. A phased-antenna array typically includes an oscillator, a plurality of antenna elements, phase adjusters or shifters, variable gain amplifiers, a receiver, and a control processor. A phased antenna array system uses phase adjusters or shifters to control the phase of the signal transmitted by an antenna element. The radiated patterns of the antenna elements constructively interfere in a particular direction creating a wavefront in that direction called the main beam. The phased array can realize increased gain and improve signal to interference plus noise ratio in the direction of the main beam. The radiation pattern destructively interferes in several other directions other than the direction of the main beam, and can reduce gain in those directions.

The amplitude and phase of the signals emanating from the antenna elements affects the side lobe levels, where the side lobes are lobes of the radiation pattern that are not in the direction of the main lobe. It is generally preferable to reduce side lobe levels such that the antenna system can focus the readings from the radiation pattern to a particular desired direction. As such, the precision of the relative phase and amplitude between the elements determine the precision of the beam direction and the side lobe levels, respectively. Thus, the accuracy of the control in phase shift and amplitude for the collection of antenna elements is important to the implementation of the phased array.

SUMMARY OF THE DISCLOSURE

The innovations described in the claims each have several aspects, no single one of which is solely responsible for the desirable attributes. Without limiting the scope of the claims, some prominent features of this disclosure will now be briefly described.

Certain aspects of the present disclosure are directed to a system for calibration of channels in an antenna array, wherein the channels are configured to perform beamforming operations, the system comprising: a power divider configured to transmit a first and a second signal to a first and a second channel, respectively; a first beamformer integrated circuit comprising: two or more channels including: a first channel configured to receive the first signal from the power divider, propagate the first signal within a transmit path of the first channel, and output a first output signal; and a second channel configured to receive the second signal from the power divider, propagate the second signal within a transmit path of the second channel, and output a second output signal; a first coupler configured to couple the first output signal to a first power detector; a second coupler configured to couple the second output signal to the first power detector; the first power detector configured to receive the coupled first and second output signals and output a first and second power value, respectively, wherein the first power detector is disposed equidistant from the first and second couplers; and a digital signal processor configured to calibrate the transmit paths of the first and second channels relative to each other based on the first and second power values.

In some aspects, the system further comprises a third coupler configured to couple a third output signal of a receive path of the first channel; a fourth coupler configured to couple a fourth output signal of a receive path of the second channel; and a second power detector configured to receive the coupled third and fourth output signals and output a third and fourth power value, respectively, wherein the second power detector is disposed equidistant from the third and fourth couplers, wherein the digital signal processor is further configured to calibrate the receive paths of the first and second channels relative to each other based on the third and fourth power values.

In some aspects, the system further comprises a first switch configured to connect the transmit path with the receive path of the first channel and a second switch configured to connect the transmit path with the receive path of the second channel.

In some aspects, the first coupler is further configured to transmit the coupled first output signal to a first phase detector; and the second coupler is further configured to transmit the coupled second output signal to the first phase detector, wherein the digital signal processor is further configured to calibrate the transmit paths of the first and second channels relative to each other based on phase values detected by the first phase detector.

In some aspects, the system further comprises a third coupler configured to couple a third output signal of a transmit path of the second channel; a fourth coupler configured to couple a fourth output signal of a transmit path of a third channel; and a second power detector configured to receive the coupled third and fourth output signals and output a third and fourth power value, respectively, wherein the second power detector is disposed equidistant from the third and fourth couplers, wherein the digital signal processor is further configured to calibrate the transmit paths of the first, second, and third channels relative to each other based on the first, second, third, and fourth power values.

In some aspects, the first channel comprises a first phase shifter and a first variable gain amplifier, and the second channel comprises a second phase shifter and a second variable gain amplifier.

In some aspects, the system further comprises a third coupler configured to couple the second output signal and transmit the coupled second output signal to a second power detector; and the second power detector configured to receive the coupled second output signal and output a third power value, respectively, wherein the output of the transmit path is disposed equidistant from the first power detector and the second power detector, wherein the digital signal processor is further configured to calibrate the first and second power detectors relative to each other based on the second and third power values.

In some aspects, the system further comprises a second beamformer integrated circuit comprising: a third channel configured to receive a third signal from the power divider, propagate the third signal within a transmit path of the third channel, and output a third output signal; and a third coupler configured to couple the third output signal and transmit the coupled third output signal to a second power detector; and the second power detector configured to receive the coupled third output signal from the third coupler and a coupled fourth output signal from the second coupler configured to couple the first output signal of the transmit path of the first channel, and output a third and fourth power value, respectively, wherein the second power detector is disposed equidistant from the second and third couplers, wherein the digital signal processor is further configured to calibrate the transmit paths of the first and third channels relative to each other based on the second and third power values.

In some aspects, the digital signal processor is further configured to calibrate the transmit paths of the first and third channels relative to each other based on a difference between the second power value and an input signal to the power divider, and a difference between the third power value and the input signal to the power divider.

In some aspects, the digital signal processor is further configured to calibrate the transmit paths of the first and third channels relative to each other based on a difference between the second power value and the third power value.

In some aspects, the power divider is further configured to divide a reference signal into the first and second signals.

In some aspects, to calibrate the transmit paths comprises adjusting a first amplifier corresponding to the transmit path of the first channel to match an output power of the transmit path of the second channel.

In some aspects, to calibrate the transmit paths comprises adjusting a first phase shifter corresponding to the transmit path of the first channel to match a phase of the transmit path of the second channel.

Certain aspects of the present disclosure are directed to a method comprising: providing a reference signal to a first channel of a beamformer; coupling a first output signal of the first channel to generate a first coupled signal; measuring, by a power detector, a first power value of the first coupled signal; providing the reference signal to a second channel of a beamformer; coupling a second output signal of the second channel to generate a second coupled signal; measuring, by the power detector, a second power value of the second coupled signal; and determining calibration data for the transmit paths of the first and second channels relative to each other based on the first and second power values.

In some aspects, the method further comprises coupling a third output signal of a receive path of the first channel; coupling a fourth output signal of a receive path of the second channel; and determining calibration data for the receive paths of the first and second channels relative to each other based on the coupled third and fourth output signals.

In some aspects, the method further comprises measuring, by a first phase detector, a first phase value of the first coupled signal; measuring, by a second phase detector, a second phase value of the second coupled signal; and determining calibration data for the transmit paths of the first and second channels relative to each other based on the first and second phase values.

In some aspects, the method further comprises coupling a third output signal of a transmit path of the second channel; coupling a fourth output signal of a transmit path of a third channel; and determining calibration data for the transmit paths of the first, second, and third channels relative to each other based on the coupled first, second, third, and fourth output signals.

In some aspects, the first channel comprises a first phase shifter and a first variable gain amplifier, and the second channel comprises a second phase shifter and a second variable gain amplifier.

In some aspects, the method further comprises calibrating the transmit path by adjusting a gain of the first variable gain amplifier or the second variable gain amplifier.

Certain aspects of the present disclosure are directed to a system for calibration of channels in an antenna array, wherein the channels are configured to perform beamforming operations, the system comprising: a power divider configured to transmit a first and a second signal to a first and a second channel, respectively; a beamformer integrated circuit comprising: two or more channels including: a first channel configured to receive the first signal from the power divider, propagate the first signal within a transmit path of the first channel, and output a first output signal; and a second channel configured to receive the second signal from the power divider, propagate the second signal within a transmit path of the second channel, and output a second output signal; a first coupler configured to couple the first output signal to a phase detector; a second coupler configured to couple the second output signal to the phase detector; and the phase detector configured to receive the coupled first and second output signals and output a first and second phase value, respectively, wherein the phase detector is disposed equidistant from the first and second couplers; and a digital signal processor configured to calibrate the transmit paths of the first and second channels relative to each other based on the first and second phase values.

For the purposes of summarizing the disclosure, certain aspects, advantages and novel features of the innovations have been described herein. It is to be understood that not necessarily all such advantages may be achieved in accordance with any particular aspect. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Throughout the drawings, reference numbers are re-used to indicate correspondence between referenced elements. The drawings are provided to illustrate aspects of the inventive subject matter described herein and not to limit the scope thereof.

DETAILED DESCRIPTION

Figure 1A:
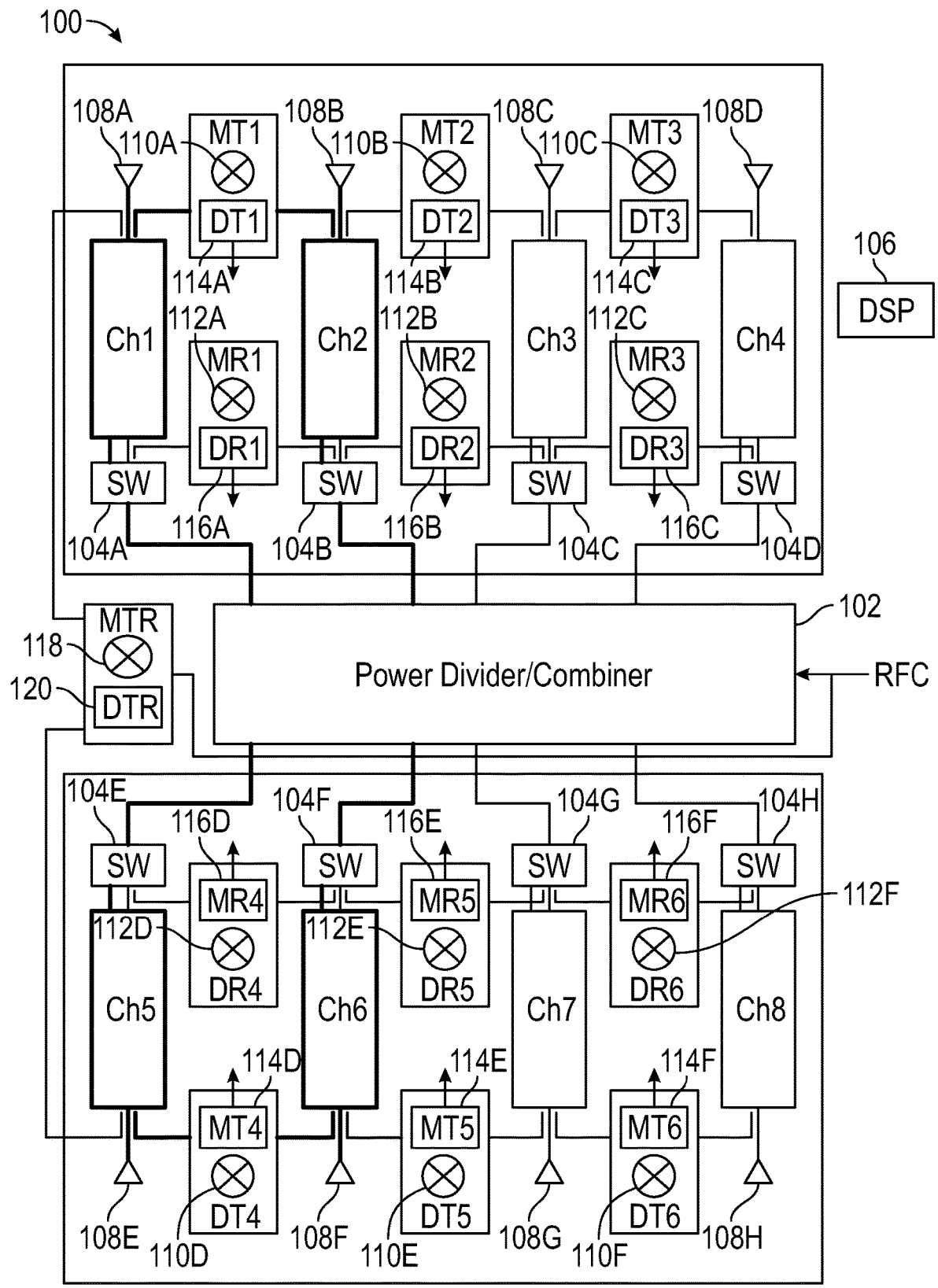
FIG. 1A illustrates a beamformer system including 8 channels, collectively configured to perform beamforming to steer a radiation pattern in a desired direction according to some aspects of the present disclosure.

The following detailed description of certain aspects presents various descriptions of specific aspects. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain aspects can include more elements than illustrated in a drawing and/or a subset of the elements illustrated in a drawing. Further, some aspects can incorporate any suitable combination of features from two or more drawings. The headings provided herein are for convenience only and do not necessarily affect the meaning or scope of the claims.

In this description, references to "an embodiment," "one embodiment," "an aspect," or the like, mean that the particular feature, function, structure or characteristic being described is included in at least one aspect of the technique or system introduced herein and may be included in multiple aspects. Occurrences of such phrases in this specification do not necessarily all refer to the same aspect. On the other hand, the aspects referred to are also not necessarily mutually exclusive.

An antenna array can enable a beamformer to steer an electromagnetic radiation pattern in a particular direction. A beamformer can generate desired antenna patterns by using a variable gain amplifier and a phase shifter to modify the gain and phase of individual antenna elements. Due to manufacturing tolerances, the amount of gain and phase applied to each antenna element to obtain a particular transmission pattern may differ. To account for these differences, it is desirable to calibrate different channels on a beamformer such that appropriate gain and phase settings may be applied to each channel of the beamformer to obtain the desired transmission pattern. One way to calibrate the beamformer is to apply an offset to each channel of the beamformer so that the channels are aligned. However, different channels may need different offset values. Further, as different users may require the beamformer, or different channels thereof, to operate differently (e.g., generate different transmission patterns), it may be difficult to determine the appropriate offset in advance. A beamformer can include a beamformer chip that may be connected to or may be integral with an antenna array. For example, the beamformer chip may have an array of patch antennas printed on the beamformer chip along with other circuitry of the chip. For the purposes of the application, certain aspects are discussed in terms of an antenna array, a beamformer, or a beamformer chip. However it is understood that some aspects can apply to multiple antenna arrays, beamformers, and/or beamformer chips.

The present disclosure enables a beamformer integrated circuit or beamformer system, which may include one or more beamformer integrated circuits, to perform calibration using channel to channel and chip to chip calibration of phase and gain mismatches between channels in a phased array system. The antenna array can perform calibration using an input test tone or a reference signal. The antenna array can perform calibration internally without interfacing with an external system. Advantageously, the antenna array can be calibrated as part of the manufacturing process and/or while being used in the field.

Traditional antenna arrays face problems of variation in phase and gain between different antenna elements due to manufacturing tolerances, material differences and/or imperfections, different fabrication centers using different systems or processes, and/or the like. Such variations can cause increased levels of side lobes. Reduced side lobes are often times critical for many antenna array applications, such as for mm wave 5G technology.

In some aspects, the antenna arrays apply a test tone signal or reference signal injected as an input to a beamformer chip. The reference signal can be divided by a power divider and can be sent to a plurality of transmit paths. Dividing the reference signal may include splitting the power of the reference signal. Thus, in some cases, the reference signal may be divided into two (or some other number) identical signals whose power may sum to the power of the original reference signal. In the case of splitting the reference signal into two, each signal may have 50% of the power of the original signal. The output of adjacent transmit paths can be used to adjust the phase and/or amplitude of the transmit paths to be relatively calibrated to one another based on a phase and/or amplitude detector equidistant from the output of adjacent transmit paths. The process can be repeated such that all transmit paths are calibrated relative to each other.

In some aspects, in order to calibrate the receive paths, a reference signal can be transmitted to a plurality of transmit paths. The output of the transmit paths can be sent back to the receive paths (e.g., by a switch that connects the transmit path to the antenna element or the receive path). The signal can propagate through the components of the receive path. Adjacent outputs of the receive paths can be used to adjust the phase and/or amplitude of the receive paths to be relatively calibrated to one another based on a phase and/or amplitude detector equidistant from the output of adjacent transmit paths. The process can be repeated such that all receive paths are calibrated relative to each other.

In some aspects, a phase and/or amplitude detector can be disposed equidistant to transmit and/or return paths that are on different chips. The process above can be used to calibrate transmit and/or receive paths across different chips, as will be described in more detail herein.

Advantageously, in certain aspects, the technology can be integrated with existing antenna systems as such components can be integrated into the antenna chip. Moreover, some aspects do not require a separate receive and transmit power divider/combiner. Calibration can be performed both at manufacture and at subsequent times, such as after the beamformer has been in operation, on a yearly basis (or other scheduled time-frame), when requested by a user, or when an error is detected in a system that incorporates the beamformer integrated circuit. Advantageously, the ability to perform calibration at any time enables the calibration to account for or to reduce the effects relating to: aging, temperature variations, or frequency variations of components. Further, calibration may be performed after manufacture without the need for additional components or systems.

Transmit Path Calibration for Antenna System

FIG. 1A illustrates a beamformer system 100 including 8 channels, collectively configured to perform beamforming to steer a radiation pattern in a desired direction according to some aspects of the present disclosure. The antenna system 100 can include a power divider/combiner 102, one or more switches 104A, 104B, 104C, 104D, 104E, 104F, 104G (collectively referred to herein as switches 104), a digital signal processor 106, channels CH1, CH2, CH3, CH4, CH5, CH6, CH7, CH8 (collectively referred to herein as channels CH1-8), antenna elements 108A, 108B, 108C, 108D, 108E, 108F, 108G (collectively referred to herein as antenna elements 108), phase detectors 110A, 110B, 110C, 110D, 110E, 110F (collectively referred to herein as phase detectors 110), 112A, 112B, 112C, 112D, 112E, 112F (collectively referred to herein as phase detectors 112), 118, and power detectors 114A, 114B, 114C, 114D, 114E, 114F (collectively referred to herein as power detectors 114), 116A, 116B, 116C, 116D, 116E, 116F (collectively referred to herein as power detectors 116), 120. To simplify discussion and not to limit the present disclosure, FIG. 1A illustrates some components, such as a single power divider/combiner 102 and 8 channels, though more or less components and/or channels may be used or supported.

Figure 1B:
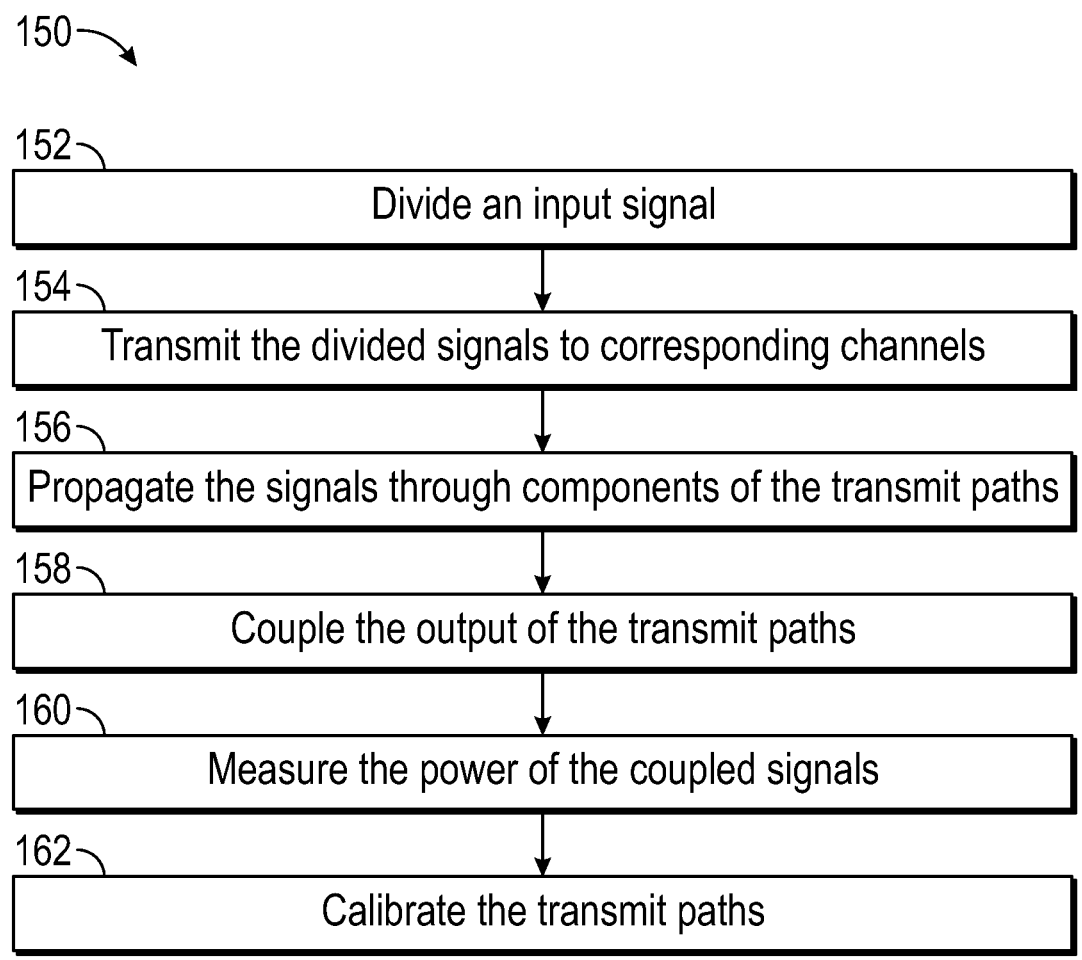
FIG. 1B illustrates a flow chart for calibrating transmit paths according to some aspects of the present disclosure.

FIG. 1B illustrates a flow chart 150 for calibrating transmit paths according to some aspects of the present disclosure. At block 152, the power divider/combiner 102 can divide an input signal and at block 154, the power divider/combiner 102 can provide the divided signals to a plurality of channels of the beamformer under test. In some aspects, the power divider/combiner 102 can receive an input signal (such as a reference signal) and divide the signal. For example, the power divider/combiner 102 can divide the signal into 8 signals, and/or the like. The divided signals can be transmitted to switches 104 corresponding to certain channels. For example, the power divider/combiner 102 can divide the signal into 8 signals and transmit the divided 8 signals to each of the 8 channels CH1-8. The input reference signal can be sent to the power divider/combiner 102 of a desired operating frequency. The switch 104 can be configured to switch the signal from the power divider/combiner 102 to either a transmit or receive path of the corresponding channel. In some cases, a set of identical reference signals may be received by the beamformer under test and may be provided to the channels under test. In some such cases, the power divider/combiner 102 may be optional or omitted.

At block 156, the system can propagate the signals through components of the transmit paths of the channels under test. In some aspects, the switch 104 can be configured to connect the power divider/combiner 102 with a transmit path of a channel. For example, in FIG. 1A, the switches 104A, 104B can be configured to connect an output signal from the power divider/combiner 102 to the transmit path of channel 1 (Ch1) and the transmit path of channel 2 (Ch2), respectively. The signals can propagate through the components of the transmit paths of channel 1 and 2. Examples of components of the transmit path can include a variable gain amplifier and a phase shifter, as will be described in more detail in FIG. 2C.

At block 158, for each channel under test, a coupler may couple the output of the corresponding transmit path for the channel. In some aspects, the output of the transmit path can be connected with antenna elements 108 and one or more couplers. For example, the output of channel 1 can connect to antenna element 108A for transmission of an output signal of channel 1. Further, a first coupler can connect to the output of channel 1 and can couple the output signal of channel 1 to obtain a sample signal. The sample signal can be provided to the phase detector 110A and the power detector 114A. In some embodiments, the sample signal is provided via a transmission line between the coupler and the detectors 110A and 114A. The output of channel 2 can connect to antenna element 108B for transmission of an output signal of channel 2. Further, a second coupler can connect to the output of channel 2 and can couple the output signal of channel 2 to obtain a sample signal and provide the sample signal to the same phase detector 110A and the power detector 114A via a transmission line between the coupler and the phase detector 110A and power detector 114A.

At block 160, the system can measure the power of the coupled signals. In some aspects, a coupler for channel 1 and a coupler for channel 2 can receive an output signal of the transmit paths for channels 1 and 2, respectively. The couplers can couple the output signal of channels to generate a sample signal. The sample signals can be transmitted to a power detector (DT1) 110A, (DT2) 110B and a phase detector (MT1) 114A, (MT2) 114B, respectively. The antenna system 100 can measure the gain and phase for each of the sample signals by the power and phase detector. In some aspects, a gain detector, amplitude detector, voltage detector, power detector, frequency detector, and/or other detectors can be used.

At block 162, the system can calibrate the transmit paths. In some aspects, the antenna system 100 can determine a difference in gain and phase between channel 1 and 2. The difference can be used by a digital signal processor, such as DSP 106 to calibrate channel 1 and 2 relative to each other. For example, if channel 1 has a gain of 2 dB and a phase of 32 degrees and channel 2 has a gain of 3 dB and a phase of 33 degrees, the beamformer 100 may modify a variable gain amplifier of channel 2 corresponding to a 1 dB attenuation to reduce the gain of channel 2 to be 2 dB (matching the gain of channel 1) and may modify the configuration of the phase shifter of channel 2 to offset the output of channel 2 by 1 degree bringing the output to 32 degrees (matching the phase of channel 1).

In some aspects, the phase detectors 110 can include a mixer or other phase detection circuitry. The mixer 110 can mix the outputs of channels 1 and 2, outputting a DC-level output that is proportional to the phase difference between the two channels (transmit paths). The output of the two channels (eg. channel 1 and channel 2) are mixed together to produce and output DC-level that is proportional to their amplitude and phase difference. As the phase shifter, within one of the channels, modifies the phase shift of that channel, the DC-level at the output of the phase detector (mixer) changes. The phase shifter may sweep or adjust the phase of one of the channels between a range of possible phases (e.g., between 0° and 180° or between 0° and 360°). During the sweep of the phase, the DC-level of the output of the phase detector is a maximum and/or a minimum DC-level among the DC-levels output at the different phase settings throughout the sweep of the phase range. The phase shifter can sweep the phase until the DC-level of the mixer is at a maximum, minimum power, and/or any other specified. The maximum and/or minimum DC-level detected at the output of the phase detector (mixer) can be used to match the phase with another channel. For example, the antenna system 100 can use the phase shifters to adjust the phase for a pair of channels and the corresponding phase detectors can yield a DC-level indicating the phase difference between the two channels. The antenna system 100 can determine a maximum, minimum, and/or any value of DC-level among all of the DC-levels detected during each phase change for a particular channel. Using the phase and DC-level information, the phases for each channel can be calibrated. For example, the phase settings can be adjusted for each channel based on the phase and DC-level information.

In some aspects, the antenna system can determine a reference voltage level in between the maximum and minimum values among the DC-levels detected during a sweep of a plurality of different phase shifts, such as the average between the maximum and minimum values: (maximum value+minimum value)/2. The beamformer can sweep the phase from maximum to minimum, then to minimum to maximum, to identify the first and second phase values that meet the average value. Then, the phase error can be determined based on: (first phase value+second phase value)/2−180.

In some aspects, when the transmit paths for channels 1 and 2 are being calibrated, all other channels may be turned off. For example, if channels 1 and 2 are being calibrated, only the phase detector 110A and power detector 114A may be measuring the outputs of the transmit paths for channel 1 and 2 for calibration.

In some aspects, when 2 channels are being calibrated, an input reference signal is sent to one of the channels, and the power of the output of the transmit path for the first channel is detected. Then, the same input reference signal that is divided by the power divider/combiner 102 is sent to the second channel, and the power of the output of the transmit path for second channel is detected. Then, the antenna system 100 can adjust the power of the first, the second, or both channels to match relative to each other.

In some aspects, when 2 channels are being calibrated, an input reference signal is sent to both of the channels, and the outputs of the transmit paths for the first and second channel are mixed. Then, the antenna system 100 can adjust the phase of the first, the second, or both channels based on the mixed signal.

In some aspects, after two channels are calibrated relative to each other, the next set of channels are calibrated. For example, the transmit paths for channels 1 and 2 are calibrated relative to each other in accordance with the above paragraphs. Then the power divider/combiner 102 transmits the input reference signal to channel 2 and channel 3. The output of the transmit paths for channels 2 and 3 are coupled to the power detector 114B and phase detector 110B. Based on the measured power and phase of the outputs of channels 2 and 3, the antenna system 100 can calibrate the power and phase of the transmit paths for channels 2 and 3 relative to each other. For example, the antenna system 100 can adjust the power and phase of channel 3 to match the power and phase of channel 2. Because channels 1 and 2 were calibrated relative to each other and channels 2 and 3 relative to each other, channels 1, 2, and 3 are all now calibrated relative to each other. Advantageously, even if there are differences or variances in the power detectors 114A and 114B, and/or the phase detectors 110A and 110B, the channels can still be calibrated relative to each other. This is because the same power detector is used to calibrate between channels (e.g., power detector 114A is used to calibrate transmit paths for the channels 1 and 2, and power detector 114B is used to calibrate transmit paths for the channels 2 and 3). Thus, calibration is not affected by detector mismatches.

In some aspects, a single reference signal (or a group of reference signals) can be used to calibrate multiple channels at once. For example, a single reference signal (or a group of reference signals) can be used to calibrate channels 1 and 2, and to calibrate channels 3 and 4. A first reference signal can be sent to the transmit path of channels 1, 2, and 3 simultaneously. The power detectors 114A, 114B, 114C and phase detectors 110A, 110B, 110C can be used to measure gain and/or phase of the same signal. A second reference signal can be sent to the transmit path of channels 2, 3, and 4. The power detectors 114A, 114C and phase detectors 110A, 110C can be used to measure gain and/or phase of the second reference signal. Then, the measured gain and/or phase can be used to calibrate channels 1-4 using 2 reference signals.

Phase Array System

Figure 2A:
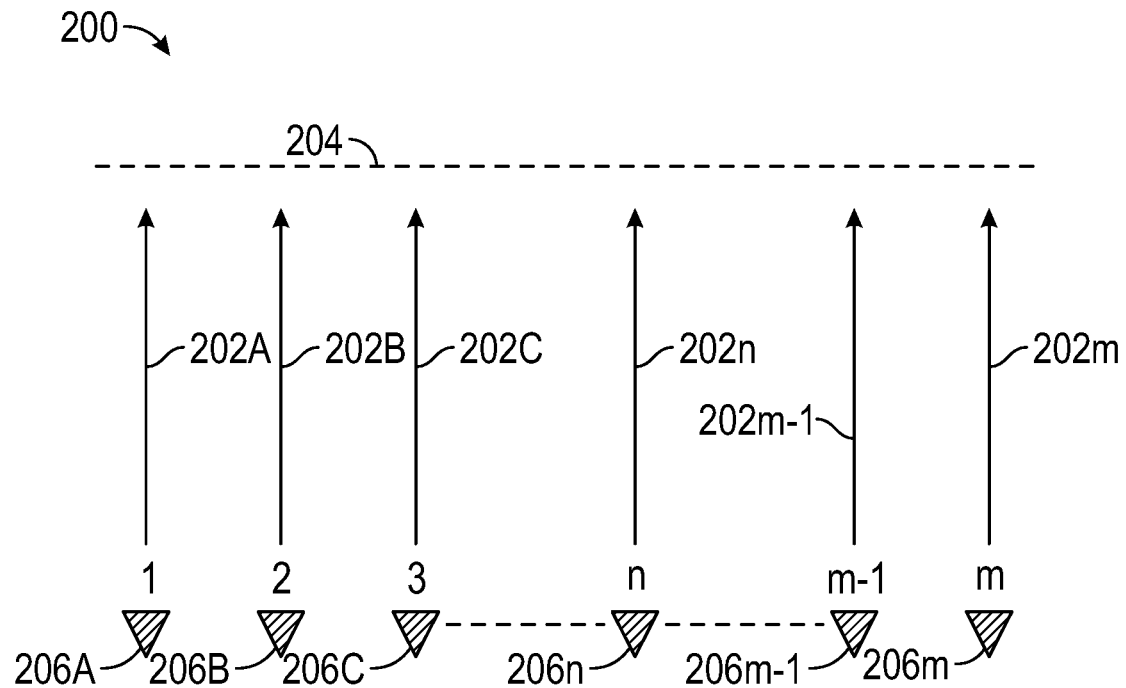
FIG. 2A is an illustration of a horizontal wavefront according to some aspects of the present disclosure.

FIG. 2A is an illustration of a horizontal wavefront 200 according to an aspect. It should be understood that the orientation of the figure is not intended to be limiting and that the horizontal wavefront 200 could be a vertical wavefront or any other linear wavefront. Each antenna element 206 may radiate in a spherical radiation pattern. However, the radiation patterns collectively generate a horizontal wavefront 204. The illustration 200 includes antenna elements 206A, 206B, 206C, 206N, 206M-1 and 206M. The antenna elements 206A, 206B, 206C, and 206N may be arranged linearly, where the elements are arranged on a straight line in a single dimension. In this configuration, the beam may be steered in one plane. The antenna elements may also be arranged planarly, arranged on a plane in two dimensions (N direction and M direction). In this planar configuration, the beam may be steered in two planes. The antenna elements may also be distributed on a non-planar surface. The planar array may be rectangular, square, circular, or the like. It is appreciated that the antenna may be arranged in other configurations, shapes, dimensions, sizes, types, other systems that can implement an antenna array, and the like. The illustration of the horizontal wavefront 200 shows each of the antenna elements 206 transmitting a signal 202A, 202B, 202C, 202N, 202M-1, and 202M (collectively referred to herein as 202) creating a horizontal wavefront 204. The illustration of FIG. 2A illustrates an antenna array creating a main beam that points upward, as shown by the horizontal wavefront 204. The phases from the antenna elements 206 are constructively interfering in the upward direction.

Figure 2B:
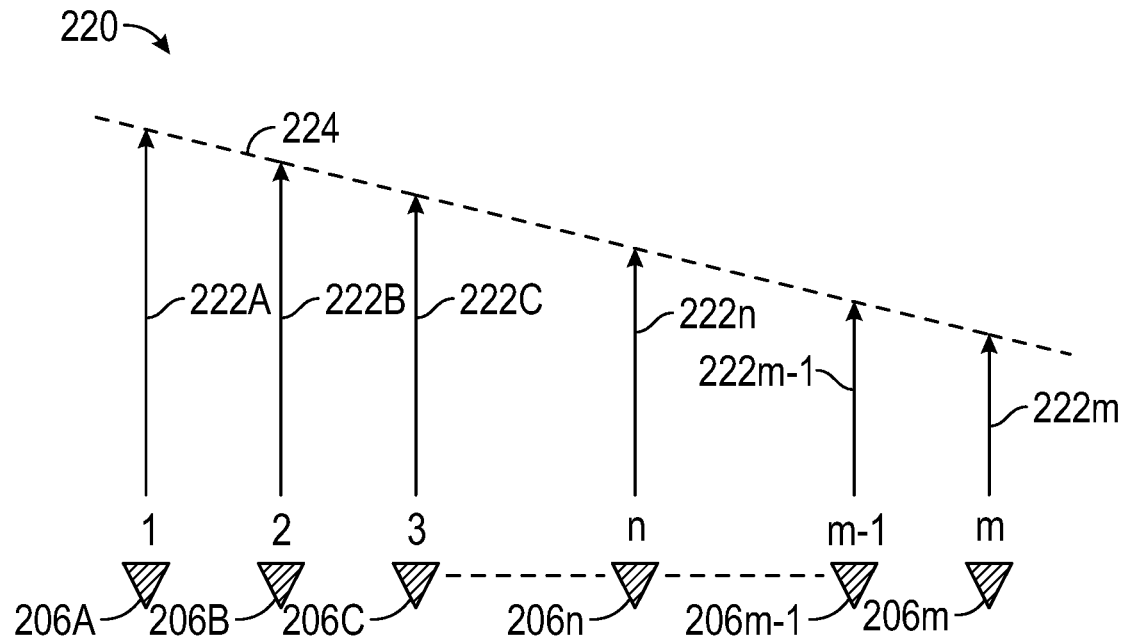
FIG. 2B is an illustration of an angled wavefront according to some aspects of the present disclosure.

FIG. 2B is an illustration of an angled wavefront 220 according to an aspect. The illustration of the angled wavefront 220 includes antenna elements 206A, 206B, 206C, 206N, 206M-1 and 206M. The antenna elements may be arranged similarly to that described for FIG. 2A. The illustration of an angled wavefront 220 shows the antenna elements 206 transmitting a signal 222A, 222B, 222C, 222N, 222M-1, and 222M (collectively referred to herein as 222) creating a wavefront 224 that propagates at an angle, different from the direction of the wavefront 204 in FIG. 2A. The phases of the signals 222 are constructively interfering in the direction that the angled wavefront 220 is traveling (e.g., up-right direction). Here, each of the phases of the antenna elements 206 may be shifted by the same degree to constructively interfere in a particular direction.

The antenna elements 206 can be spaced apart equidistant from one another. In some aspects, the antenna elements 206 are spaced at different distances from each other, but with a probe equidistant from at least two antenna elements 206.

Although the disclosure may discuss certain aspects as one type of antenna array, it is understood that the aspects may be implemented on different types of antenna arrays, such as time domain beamformers, frequency domain beamformers, dynamic antenna arrays, active antenna arrays, passive antenna arrays, and the like.

Figure 2C:
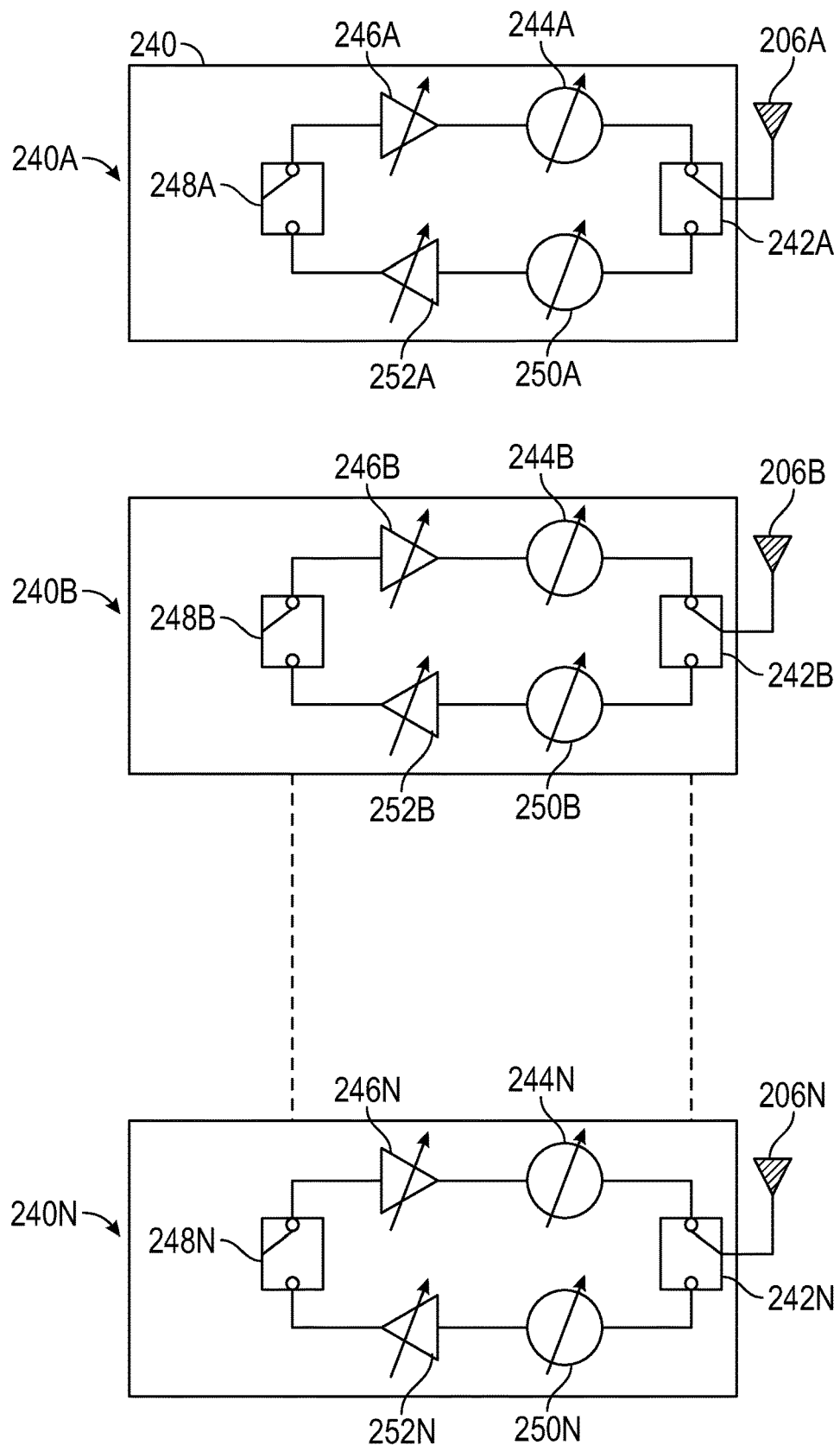
FIG. 2C is a schematic block diagram of a series of transceivers according to some aspects of the present disclosure.

FIG. 2C is a schematic block diagram of a series of transceivers 240A, 240B, 240N (collectively referred to herein as 240) according to an aspect. In some aspects, a single transceiver 240 feeds to a single antenna element 206. However, it is appreciated that a single transceiver 240 may feed to multiple antenna elements 206, or a single antenna element 206 may be connected to a plurality of transceivers 240. Furthermore, it is appreciated that the antenna element 206 may be linked to a receiver and/or a transmitter.

In some aspects, the transceiver 240 may include a switch 242A, 242B, 242N (collectively referred to herein as 242) to switch the path from the antenna element 206 to the receiver or the transmitter path. The transceiver 240 includes another switch 248A, 248B, 248N (collectively referred to herein as 248) that switches the path from the signal processor (not shown, such as power combiner/divider) to the receiver or the transmitter path. The transmitter path (or the transmit path) has a phase adjuster 244A, 244B, 244N (collectively referred to herein as 244) and a variable gain amplifier 246A, 246B, 246N (collectively referred to herein as 246). The phase adjuster 244 adjusts the phase of the transmitted signal at the antenna element 206 and the variable gain amplifier 246 adjusts the amplitude of the transmitted signal at the antenna element 206. Although the aspects describe the transceiver 240 including a phase adjuster 244 and a variable gain amplifier 246, other components can be used to adjust the magnitude of the signal and/or the phase of the signal. Furthermore, although a switch is shown to switch from the transmitter path to the receive path, other components can be used, such as a duplexer.

The receiver path (or the receive path) may also have a phase adjuster 250A, 250B, 250N (collectively referred to herein as 250), and a variable gain amplifier 252A, 252B, 252N (collectively referred to herein as 252). The phase adjuster 250 and the variable gain amplifier 252 can be used to adjust the received signal from the antenna element 206 before going to the signal processor (not shown).

Figure 2D:
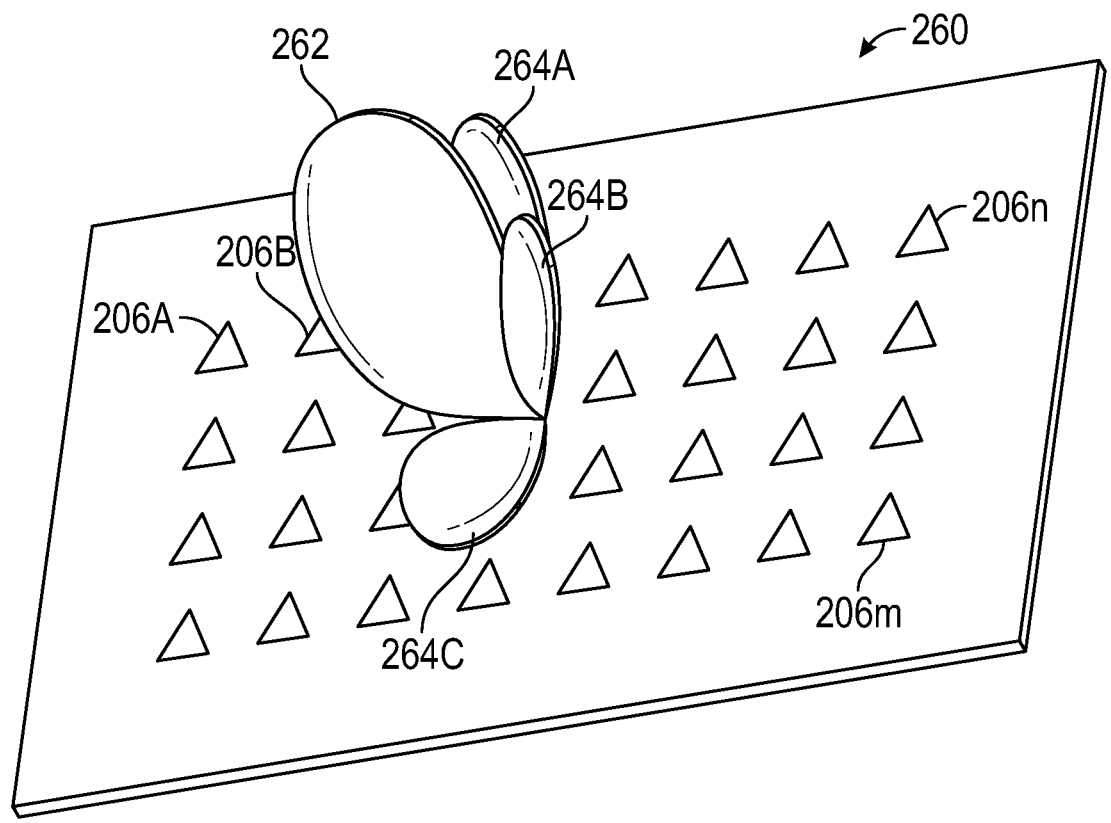
FIG. 2D is an illustration of a planar phased array and an associated electromagnetic pattern according to some aspects of the present disclosure.

FIG. 2D is an illustration of a planar phased array 260 and an associated electromagnetic pattern according to an aspect. FIG. 2D includes antenna elements 206A, 206B, 206N, 206M-1, and 206M. FIG. 2D also includes a beam pattern with a main beam 262, and side lobes 264A, 264B, 264C. The antenna elements 206 are transmitting a signal where the phase of the signal is constructively interfering in the direction of the main beam 262. The precision of the amplitude of the antenna elements 206 controls the side-lobe levels. For example, the more uniform the amplitudes of the transmitted signals from the antenna elements 206 are, the lower the side lobe levels will be. The antenna elements 206 may be disposed on a single die, or multiple dies.

Receive Path Calibration for Antenna System

Figure 3:
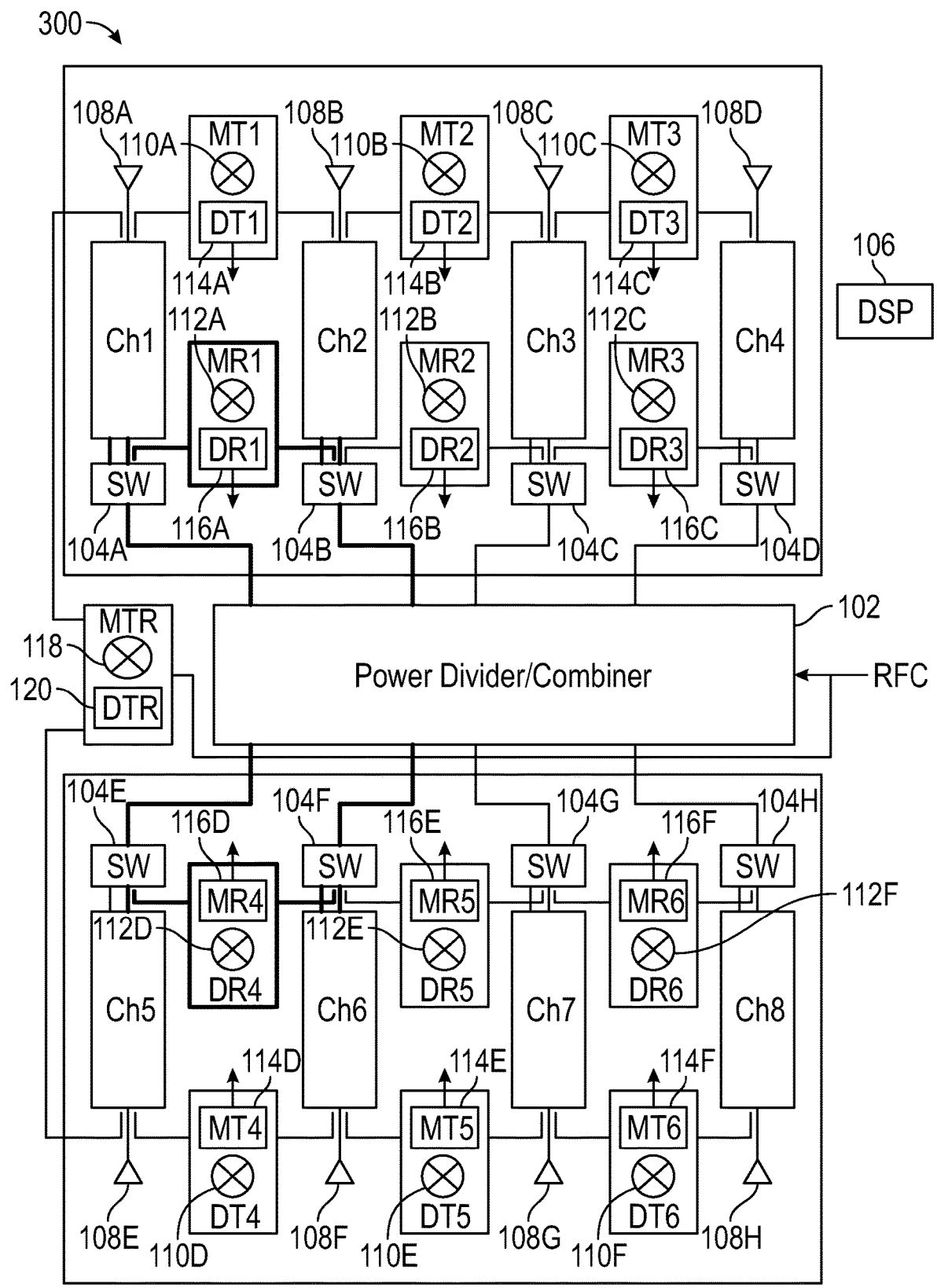
FIG. 3 illustrates an antenna system for calibrating receive paths according to some aspects of the present disclosure.

FIG. 3 illustrates an antenna system 300 for calibrating receive paths according to some aspects of the present disclosure. The antenna system 300 can include more or less components of the antenna system 100 of FIG. 1A. To simplify discussion and not to limit the present disclosure, FIG. 3 illustrates some components, such as a single power divider/combiner 102 and 8 channels, though more or less components and/or channels may be used.

In some aspects, after the transmit paths are calibrated with one another (such as the transmit paths of channel 1 and channel 2 as explained with respect to FIG. 1A), the receive paths can be calibrated relative to each other. For example, a signal can be transmitted through the transmit paths of channel 1 and channel 2. A switch, such as the switch 242 in FIG. 2C, can connect the end of the transmit path directly with the beginning of the return path. The signals can then propagate through the return paths for channel 1 and channel 2. A coupler at the end of the return paths can connect to the output of the return paths to generate sample signals to be sent to a gain and phase detectors for the return paths, such as the phase detector 112A and/or the gain detector 116A (MR1, DR1). Based on the received sample signals at the phase detector 112A and/or the gain detector 116A, the return paths for channels 1 and 2 can be calibrated relative to one another. This can be done because the transmit paths are already calibrated relative to each other.

In some aspects, the channels can be calibrated based on a difference in gain and/or phase between channels 1 and 2. The difference can be used to calibrate channel 1 and 2 relative to each other. For example, if the output of the return path for channel 1 has a gain of 2 dB and a phase of 32 degrees and the output of the return path for channel 2 has a gain of 3 dB and a phase of 33 degrees, the antenna system 300 can send a signal to the low noise amplifier of channel 2 corresponding to a 1 dB attenuation to reduce the gain of channel 2 to be 2 dB (matching the gain of channel 1) and send a signal to the phase shifter of channel 2 corresponding to a 1 degree offset to offset the output of channel 2 to be 32 degrees (matching the phase of channel 1).

In some aspects, the calibration can be performed on the return path by adjusting an amplifier and phase shifter, such as the variable gain amplifiers 252 and the phase shifters 250 of FIG. 2C.

In some aspects, the phase detectors 112 can include a mixer. The mixer 112 can mix the outputs of the return paths for channels 1 and 2, outputting a DC output. The phase shifter in the return path for one of the channels (e.g., for channel 1) can be rotated and the output DC-level of the mixer measured. The phase shifter can be shifted until the DC-level of the mixer is at a maximum and/or minimum DC-level. The maximum and/or minimum DC-level can be used to match the phase. For example, the antenna system 300 can adjust the phase of the phase shifters for the maximum and/or minimum DC level.

In some aspects, when the return paths for channels 1 and 2 are being calibrated, all other channels are turned off. For example, if channels 1 and 2 are being calibrated, only the phase detector 112A and power detector 116A are measuring the outputs of the receive paths for channel 1 and 2 for calibration.

In some aspects, when 2 channels are being calibrated, an input reference signal is sent to one of the channels, and the power of the output of the return path for the first channel is detected. Then, the same input reference signal that is divided by the power divider/combiner 102 is sent to the second channel, and the power of output of the return path for the second channel is detected. Then, the antenna system 300 can adjust the power of the first, the second, or both channels to match relative to each other through the variable gain amplifier 252. In some aspects, when 2 channels are being calibrated, an input reference signal is sent to the two channels, and the DC-level of the output of the phase detector is detected. Then, the antenna system 300 can adjust the phase of the first, the second, or both channels to match relative to each other through the phase shifter 250.

In some aspects, after two channels are calibrated relative to each other, the next set of channels are calibrated. For example, the return paths for channels 1 and 2 are calibrated relative to each other in accordance with the above paragraphs. Then the power divider/combiner 102 sends the input reference signal to channel 2 and channel 3. The output of the return paths for the channels 2 and 3 are coupled to the power detector 112B and phase detector 116B.

In some aspects, based on the measured power and phase of the outputs of channels 2 and 3, the antenna system 300 can calibrate the power and phase of the return paths for the channels 2 and 3 relative to each other. For example, the antenna system 300 can adjust the power and phase of channel 3 to match the power and phase of channel 2. Because channels 1 and 2 were calibrated relative to each other and channels 2 and 3 relative to each other, channels 1, 2, and 3 are all now calibrated relative to each other. Advantageously, even if there are differences or variances in the power detectors 116A and 116B, and/or the phase detectors 112A and 112B, the channels can still be calibrated relative to each other. This is because the same power detector is used to calibrate between channels (e.g., power detector 116A is used to calibrate return paths for the channels 1 and 2, and power detector 116B is used to calibrate return paths for the channels 2 and 3). Thus, calibration is not affected by detector mismatches.

Phase and/or Power Detector Calibration

Figure 4:
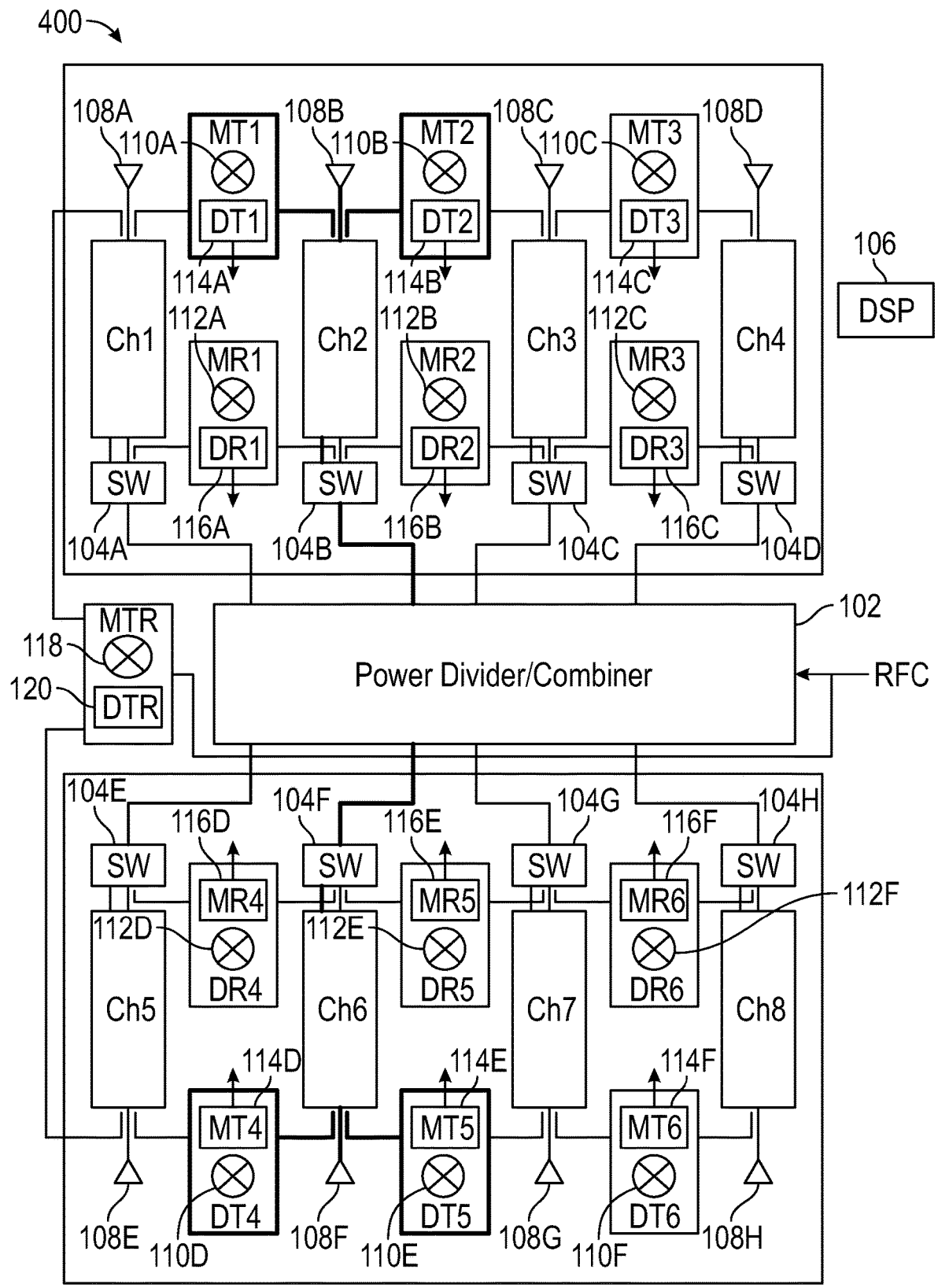
FIG. 4 illustrates a beamformer system for calibrating phase and/or power detectors according to some aspects of the present disclosure.

FIG. 4 illustrates an antenna system 400 for calibrating phase and/or power detectors according to some aspects of the present disclosure. The antenna system 400 can include more or less components of the antenna system 100 of FIG. 1A. To simplify discussion and not to limit the present disclosure, FIG. 4 illustrates some components, such as a single power divider/combiner 102 and 8 channels, though more or less components may be used.

In some aspects, the power and/or phase detectors can be calibrated relative to each other. The antenna system 400 can transmit a signal to a channel, such as channel 2. The signal is propagated through the transmit path. A first sample signal can be generated by one coupler connected to the output of the transmit path and sent to a first set of gain and phase detectors, such as the gain detector 114A and the phase detector 110A (MT1, DT1). A second sample signal can be generated by another coupler and sent to a second set of gain and phase detectors, such as the gain detector 114B and the phase detector 110B (MT2, DT2).

In some aspects, the gain detectors 114A, 114B, and phase detectors 110A, 110B can be calibrated relative to one another based on the first and second sample signals. For example, the signal at the output of the transmit path for channel 2 can be 2 dB with a phase offset of 10 degrees. The gain detectors 114A, 114B can receive a sample signal of 0.2 dB. However, the first detector 114A (DT1) may read the sample signal as 0.2 dB and the second detector 114B (DT2) may read the sample signal as 0.21 dB. The antenna system 400 can determine to reduce gain of the second detector 114B (DT2) by 0.01 dB to match signals measured by the first detector 114A (DT1). Accordingly, the gain detectors 114A, 114B can be calibrated relative to one another. Similarly, the phase detectors 110A, 110B can retrieve a sample signal with a 10 degree phase offset. However, the first phase detector 110A (MT1) may read the sample signal as 10 degrees offset and the second phase detector 110B (MT2) may read the sample signal as 11 degrees offset. The antenna system 400 can determine to offset signals measured by the second phase detector 110B (MT2) by 1 degree to match the degree offset measured by the first phase detector 110A (MT1). Accordingly, the phase detectors 110A, 110B can be calibrated relative to one another.

Chip-to-Chip Calibration

Figure 5A:
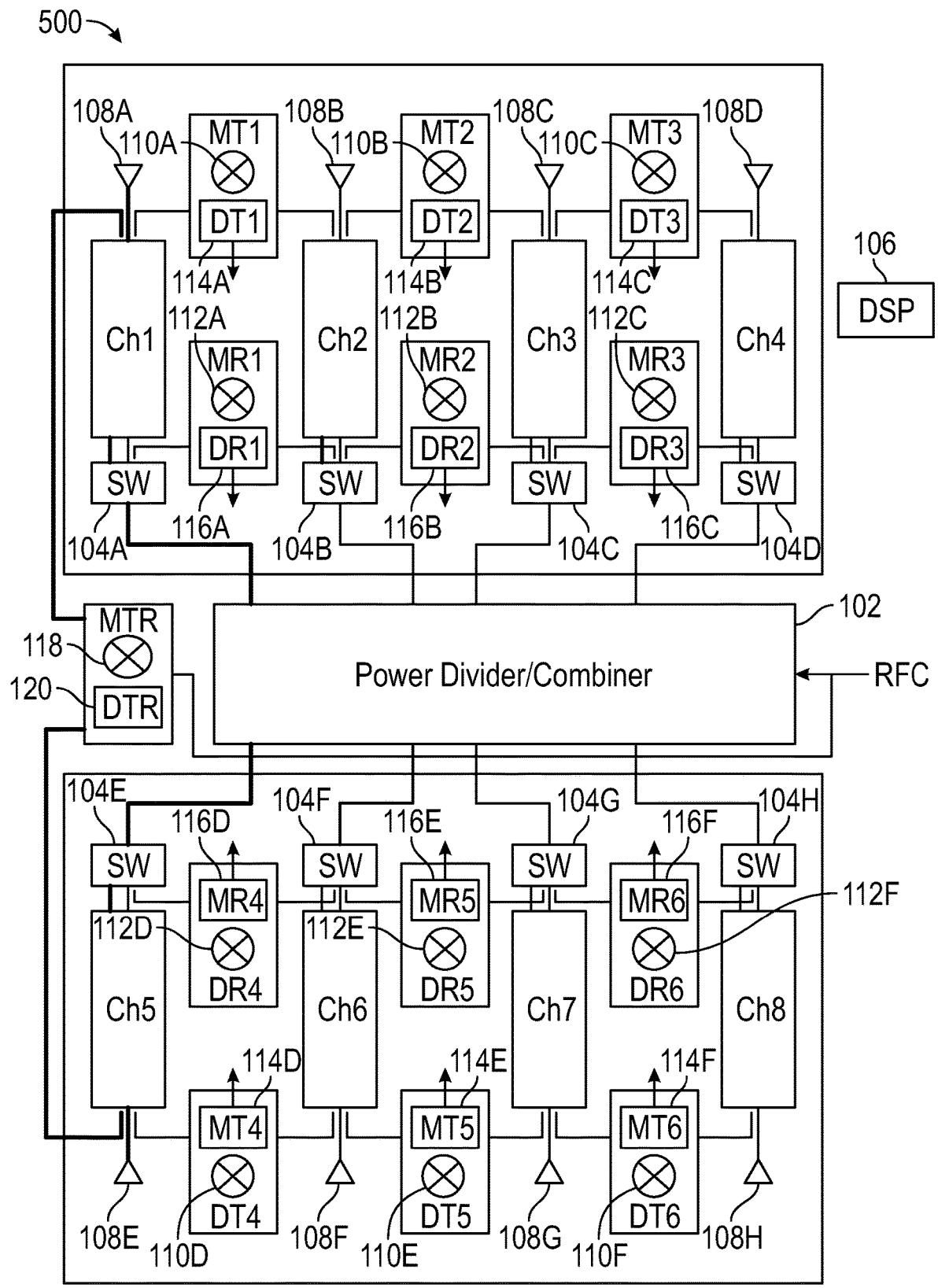
FIG. 5A illustrates a beamformer system for multiple antenna array calibration according to some aspects of the present disclosure.

FIG. 5A illustrates an antenna system 500 for multiple antenna array calibration according to some aspects of the present disclosure. The antenna system 500 can include more or less components of the antenna system 100 of FIG. 1A. To simplify discussion and not to limit the present disclosure, FIG. 5A illustrates some components, such as a single power divider/combiner 102 and 8 channels, though more or less components may be used.

In some aspects, the antenna system 500 can transmit a signal to different antenna arrays. For example, the first antenna array can include channels 1-8 and a second antenna array can include channels 1-8. The antenna system 500 can transmit a signal to channels of two antenna arrays, via on board power divider/combiner 102. The signals can propagate through the transmit paths for channels 1 in both antenna arrays.

Figure 5B:
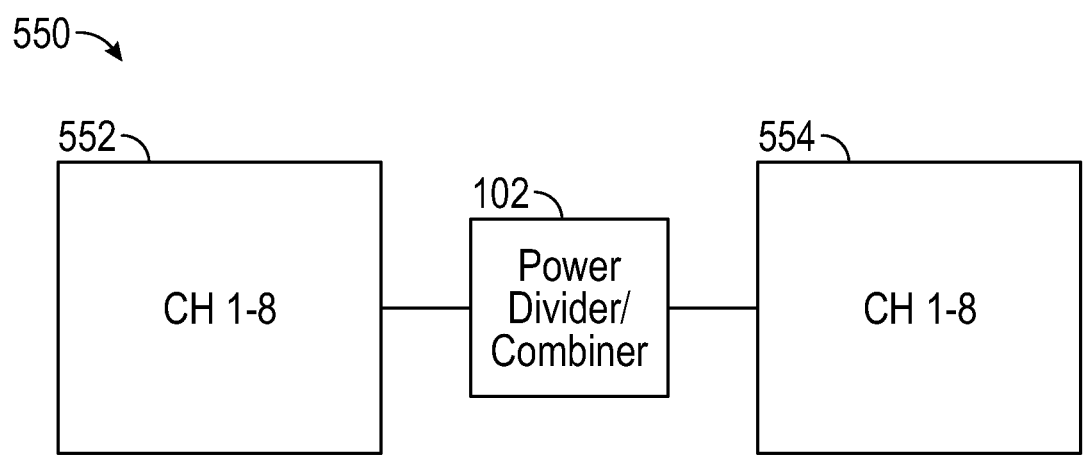
FIG. 5B illustrates an antenna system 550 for multiple chip calibration according to some aspects of the present disclosure.

FIG. 5B illustrates an antenna system 550 for multiple chip calibration according to some embodiments of the present disclosure. The antenna system 550 can transmit a signal to different antenna array chips. For example, the first chip 552 can include channels 1-8 and a second chip 554 can include channels 1-8. The antenna system 500 can transmit a signal to channels of two chip, via on board power divider/combiner 102. The signals can propagate through the transmit paths for channels 1 in both antenna array chips.

In some aspects, couplers can connect to the outputs of the transmit paths to generate sample signals of the outputs of the transmit paths for channels 1 of both chips. The sample signals can be sent to a gain and phase detector, such as a gain detector 120 and a phase detector 118 (MTR, DTR) and compared to the input signal of the appearing at the RF common port (RFC) for each antenna array chip. The antenna system 550 can use the sample signals to calibrate channels 1 to the input signal at RFC and similarly for both chips. Because the input signal to both chips is the same, channels 1 of both chips will be relative calibrated to one another. Similar processes described above can be used to calibrate channels 1-8 relative to one another within both chips. Thus, the antenna system can calibrate all the channels, either located within the same chip or on a different chip relative to one another.

In some aspects, the digital signal processor 106 can calibrate the gain between channels of different antenna chips based on a difference. For example, the digital signal processor 106 can calibrate the gain between channels 1 of both chips based on a difference between the power detected by the power detector on the first chip 552 and the power detected by the power detector on the second chip 554. In some aspects, the digital signal processor 106 can calibrate the gain between channels 1 and 5 based on a difference between the power detected by the power detector 114A and the input of the power divider/combiner 102, based on a difference between the power detected by the power detector 114D and the input of the power divider/combiner 102.

Detector Architecture

Figure 6:
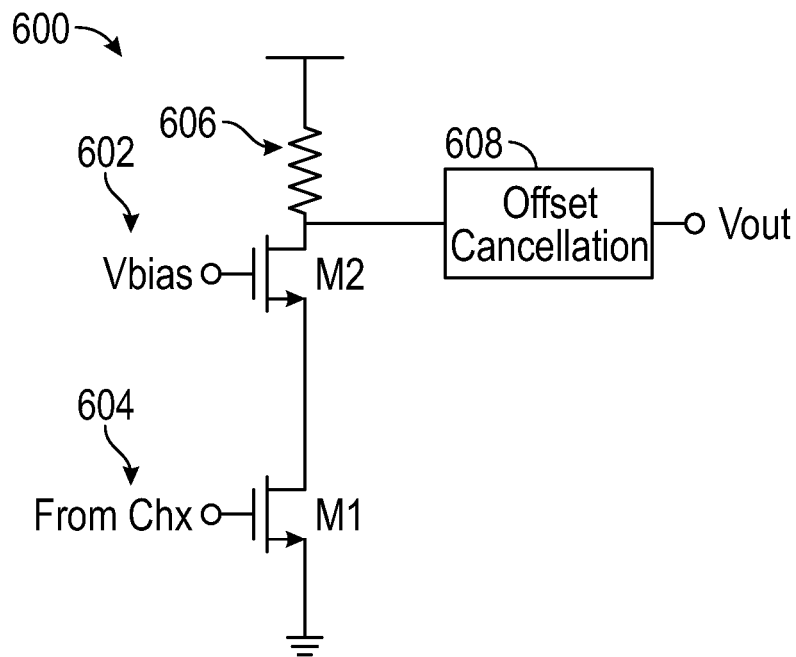
FIG. 6 illustrates a detector architecture according to some aspects of the present disclosure.

FIG. 6 illustrates a detector architecture 600 according to some aspects of the present disclosure. The detector architecture 600 can include one or more features of a detector of FIG. 1A, such as detector 114. The detector architecture 600 can include a transistor 604 (M1), a transistor 602 (M2), a resistor 606, and an offset cancellation module 608. To simplify discussion and not to limit the present disclosure, FIG. 6 illustrates some components, such as a single resistor 606, though more or less components may be used.

In some aspects, the transistor 604 (M1) can be biased in a subthreshold region. The input of the channel Chx can be converted to a DC component that indicates the power level at Vout. The offset cancellation module 608 can be used to reduce the effect of the non-idealities on the power detection level.

Figure 7:
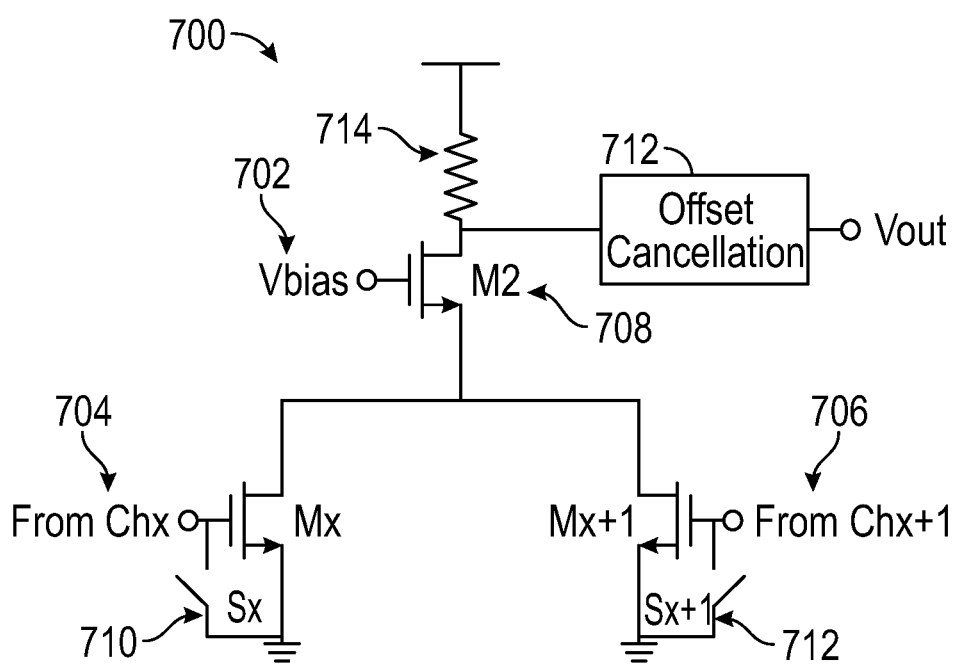
FIG. 7 illustrates another detector architecture according to some aspects of the present disclosure.

FIG. 7 illustrates another detector architecture 700 according to some aspects of the present disclosure. The detector architecture 700 can include one or more features of a detector of FIG. 1A, such as detector 114. The detector architecture 700 can include a transistor 704 (Mx), a transistor 702 (M2), a transistor 706 (Mx+1), a resistor 714, an offset cancellation module 710, a switch 710 (Sx), and a switch 712 (Sx+1). To simplify discussion and not to limit the present disclosure, FIG. 7 illustrates some components, such as a single resistor 714, though more or less components may be used.

In some aspects, the detector 700 can perform detection and multiplication, such as the power detection and phase detection of the antenna system. The transistors 704 (Mx) and 706 (Mx+1) can be biased in a subthreshold region. To detect the power of the Chx channel, the switch 710 (Sx) is switched off, and the switch 712 (Sx+1) is switched on. This injects the power of Chx and not Chx+1. To detect the power of the Chx+1 channel, the switch 710 (Sx) is switched on, and the switch 712 (Sx+1) is switched off. This injects the power of Chx+1 and not Chx.

In some aspects, the transistors 704 (Mx) and 706 (Mx+1) can be biased in a linear region. Because the transistors 704 (Mx) and 706 (Mx+1) are in a linear region, the multiplication occurs and the phase difference can be determined.

Additional Aspects

Any of the principles and advantages discussed herein can be applied to other systems, not just to the systems described above. Some aspects can include a subset of features and/or advantages set forth herein. The elements and operations of the various aspects described above can be combined to provide further aspects. The acts of the methods discussed herein can be performed in any order as appropriate. Moreover, the acts of the methods discussed herein can be performed serially or in parallel, as appropriate. While circuits are illustrated in particular arrangements, other equivalent arrangements are possible.

Any of the principles and advantages discussed herein can be implemented in connection with any other systems, apparatus, or methods that could benefit from any of the teachings herein. For instance, any of the principles and advantages discussed herein can be implemented in connection with any devices with a need to adjust the amplitude or phase of a phased array.

Aspects of this disclosure can be implemented in various electronic devices. For instance, one or more of the above phased array aspects can be implemented in accordance with any of the principles and advantages discussed herein in various electronic devices. Examples of the electronic devices can include, but are not limited to, cell phone base stations, radar systems, radar detectors, consumer electronic products, parts of the consumer electronic products such as semiconductor die and/or packaged modules, electronic test equipment, etc. Examples of the electronic devices can also include communication networks. The consumer electronic products can include, but are not limited to, a phone such as a smart phone, a laptop computer, a tablet computer, a wearable computing device such as a smart watch or an ear piece, an automobile, a camcorder, a camera, a digital camera, a portable memory chip, a washer, a dryer, a washer/dryer, a copier, a facsimile machine, a scanner, a multifunctional peripheral device, a wireless access point, a router, etc. Further, the electronic device can include unfinished products, including those for industrial and/or medical applications.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or "connected", as generally used herein, refer to two or more elements that may be either directly connected, or connected by way of one or more intermediate elements. Thus, although the various schematics shown in the figures depict example arrangements of elements and components, additional intervening elements, devices, features, or components may be present in an actual aspect (assuming that the functionality of the depicted circuits is not adversely affected). Additionally, the words "herein," "above," "below," and words of similar import, when used in this application, shall refer to this application as a whole and not to any particular portions of this application. Where the context permits, words in the Detailed Description of Certain Aspects using the singular or plural number may also include the plural or singular number, respectively. The words "or" in reference to a list of two or more items, is intended to cover all of the following interpretations of the word: any of the items in the list, all of the items in the list, and any combination of the items in the list. All numerical values or distances provided herein are intended to include similar values within a measurement error.

While certain aspects have been described, these aspects have been presented by way of example only, and are not intended to limit the scope of the disclosure. Indeed, the novel apparatus, systems, and methods described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A system for calibration of channels in an antenna array, wherein the channels are configured to perform beamforming operations, the system comprising:
 a power divider configured to transmit a first and a second signal to a first and a second channel, respectively;
 a first beamformer integrated circuit comprising:
  two or more channels including:
   a first channel configured to receive the first signal from the power divider, propagate the first signal within a transmit path of the first channel, and output a first output signal; and
   a second channel configured to receive the second signal from the power divider, propagate the second signal within a transmit path of the second channel, and output a second output signal;
  a first coupler configured to couple the first output signal to a first power detector;
  a second coupler configured to couple the second output signal to the first power detector;
  the first power detector configured to receive the coupled first and second output signals and output a first and second power value, respectively, wherein the first power detector is disposed equidistant from the first and second couplers; and a digital signal processor configured to calibrate the transmit paths of the first and second channels relative to each other based on the first and second power values by at least adjusting a first amplifier corresponding to the transmit path of the first channel to match an output power of the transmit path of the second channel.

2. The system of claim 1, further comprising:
a third coupler configured to couple a third output signal of a receive path of the first channel;
a fourth coupler configured to couple a fourth output signal of a receive path of the second channel; and
a second power detector configured to receive the coupled third and fourth output signals and output a third and fourth power value, respectively, wherein the second power detector is disposed equidistant from the third and fourth couplers, wherein the digital signal processor is further configured to calibrate the receive paths of the first and second channels relative to each other based on the third and fourth power values.

3. The system of claim 2, wherein the system further comprises a first switch configured to connect the transmit path with the receive path of the first channel and a second switch configured to connect the transmit path with the receive path of the second channel.

4. The system of claim 1, wherein:
the first coupler is further configured to transmit the coupled first output signal to a first phase detector; and
the second coupler is further configured to transmit the coupled second output signal to the first phase detector, wherein the digital signal processor is further configured to calibrate the transmit paths of the first and second channels relative to each other based on phase values detected by the first phase detector.

5. The system of claim 1, further comprising:
a third coupler configured to couple a third output signal of a transmit path of the second channel;
a fourth coupler configured to couple a fourth output signal of a transmit path of a third channel; and
a second power detector configured to receive the coupled third and fourth output signals and output a third and fourth power value, respectively, wherein the second power detector is disposed equidistant from the third and fourth couplers, wherein the digital signal processor is further configured to calibrate the transmit paths of the first, second, and third channels relative to each other based on the first, second, third, and fourth power values.

6. The system of claim 1, wherein the first channel comprises a first phase shifter and a first variable gain amplifier, and the second channel comprises a second phase shifter and a second variable gain amplifier.

7. The system of claim 1, wherein the system further comprises:
a third coupler configured to couple the second output signal and transmit the coupled second output signal to a second power detector; and
the second power detector configured to receive the coupled second output signal and output a third power value, respectively, wherein the output of the transmit path is disposed equidistant from the first power detector and the second power detector, wherein the digital signal processor is further configured to calibrate the first and second power detectors relative to each other based on the second and third power values.

8. The system of claim 1, wherein the system further comprises:
a second beamformer integrated circuit comprising:
a third channel configured to receive a third signal from the power divider, propagate the third signal within a transmit path of the third channel, and output a third output signal; and
a third coupler configured to couple the third output signal and transmit the coupled third output signal to a second power detector; and
the second power detector configured to receive the coupled third output signal from the third coupler and a coupled fourth output signal from the second coupler configured to couple the first output signal of the transmit path of the first channel, and output a third and fourth power value, respectively,
wherein the second power detector is disposed equidistant from the second and third couplers,
wherein the digital signal processor is further configured to calibrate the transmit paths of the first and third channels relative to each other based on the second and third power values.

9. The system of claim 8, wherein the digital signal processor is further configured to calibrate the transmit paths of the first and third channels relative to each other based on a difference between the second power value and an input signal to the power divider, and a difference between the third power value and the input signal to the power divider.

10. The system of claim 8, wherein the digital signal processor is further configured to calibrate the transmit paths of the first and third channels relative to each other based on a difference between the second power value and the third power value.

11. The system of claim 1, wherein the power divider is further configured to divide a reference signal into the first and second signals.

12. The system of claim 1, wherein the digital signal processor is further configured to calibrate the transmit paths by at least adjusting a first phase shifter corresponding to the transmit path of the first channel to match a phase of the transmit path of the second channel.

13. A method comprising:
providing, by a power divider, a reference signal to a first channel of a beamformer, wherein the first channel comprises a first phase shifter and a first variable gain amplifier;
coupling a first output signal of the first channel to generate a first coupled signal;
measuring, by a power detector, a first power value of the first coupled signal;
providing, by the power divider, a second reference signal to a second channel of the beamformer, wherein the second channel comprises a second phase shifter and a second variable gain amplifier;
coupling a second output signal of the second channel to generate a second coupled signal;
measuring, by the power detector, a second power value of the second coupled signal;
determining calibration data for transmit paths of the first and second channels relative to each other based on the first and second power values; and
calibrating the transmit path by adjusting a gain of the first variable gain amplifier corresponding to the transmit path of the first channel to match an output power of the transmit path of the second channel or the second variable gain amplifier corresponding to the transmit path of the second channel to match an output power of the transmit path of the first channel.

14. The method of claim 13, further comprising:
coupling a third output signal of a receive path of the first channel;
coupling a fourth output signal of a receive path of the second channel; and
determining calibration data for the receive paths of the first and second channels relative to each other based on the coupled third and fourth output signals.

15. The method of claim 13, further comprising:
measuring, by a first phase detector, a first phase value of the first coupled signal;
measuring, by a second phase detector, a second phase value of the second coupled signal; and
determining calibration data for the transmit paths of the first and second channels relative to each other based on the first and second phase values.

16. The method of claim 13, further comprising:
coupling a third output signal of the transmit path of the second channel;
coupling a fourth output signal of a transmit path of a third channel; and
determining calibration data for the transmit paths of the first, second, and third channels relative to each other based on the coupled first, second, third, and fourth output signals.

17. A system for calibration of channels in an antenna array, wherein the channels are configured to perform beamforming operations, the system comprising:
a power divider configured to transmit a first and a second signal to a first and a second channel, respectively;
a beamformer integrated circuit comprising:
two or more channels including:
a first channel configured to receive the first signal from the power divider, propagate the first signal within a transmit path of the first channel, and output a first output signal, wherein the first channel comprises a first phase shifter and a first variable gain amplifier; and
a second channel configured to receive the second signal from the power divider, propagate the second signal within a transmit path of the second channel, and output a second output signal, wherein the second channel comprises a second phase shifter and a second variable gain amplifier;
a first coupler configured to couple the first output signal to a phase detector;
a second coupler configured to couple the second output signal to the phase detector; and
the phase detector configured to receive the coupled first and second output signals and output a first and second phase value, respectively, wherein the phase detector is disposed equidistant from the first and second couplers; and
a digital signal processor configured to calibrate the transmit paths of the first and second channels relative to each other based on the first and second phase values, wherein calibrating the transmit paths comprises adjusting a gain of the first variable gain amplifier corresponding to the transmit path of the first channel to match an output power of the transmit path of the second channel or the second variable gain amplifier corresponding to the transmit path of the second channel to match an output power of the transmit path of the first channel.

* * * * *